Patented June 13, 1939

2,162,655

UNITED STATES PATENT OFFICE 2,162,655

PRODUCTION OF SOLID AMMONIUM PERPHOSPHATE

Walter Völkel, Frankfort-on-the-Main, Germany, assignor to Deutsche Gold und Silber Scheideanstalt vormals Roessler, Frankfort-on-the-Main, Germany, a corporation of Germany No Drawing. Application July 29, 1936, Serial No. 93,254. In Germany August 1, 1935

11 Claims. (Cl. 23—107)

This application is, in part, a continuation of my application Serial No. 29,737, filed July 3, 1935.

This invention is concerned with the preparation of solid ammonium perphosphate. It is already known that ammonium phosphate will form addition compounds with hydrogen peroxide, the hydrogen peroxide being present as hydrogen peroxide of crystallization analogous to the water of crystallization present in hydrated compounds. Ammonium phosphate containing hydrogen peroxide of crystallization has been frequently but inappropriately termed "ammonium perphosphate" by chemists. This application is concerned with the preparation of true solid ammonium perphosphate, as distinguished from those compounds merely containing hydrogen peroxide of crystallization and erroneously termed "perphosphates".

The compounds prepared in accordance with this invention are genuine perphosphates and contain a peroxide group, i. e., an oxygen to oxygen bridge, in the molecule. Up until the present time true ammonium perphosphate existed only in solution and had not been separated in the form of the solid compound. While ammonium perphosphate has been previously prepared in solution by chemists such as Fichter and Gutzwiller, whose work is described in the Helvetica Chimica Acta, Vol. XI, page 333, all previous experiments to obtain this salt in the solid form have been unsuccessful.

Fichter and Gutzwiller prepared ammonium perphosphate in solution by the electrolysis of solutions of ammonium phosphate containing fluorides. These experimenters attributed the failure of their attempts to obtain the salt in the solid form of an "inner weakness" of the ammonium perphosphate molecule. In attempting to isolate the solid ammonium perphosphate salt they believed that the ammonium ion, or the hydrolytically evolved ammonium radical, was oxidized by the perphosphate ion, thus resulting in decomposition of the compound. The experiments of Fichter and Gutzwiller indicate that the higher the concentration of ammonium perphosphate in solution the more rapid does the decomposition occur.

I have now discovered that it is possible to obtain true ammonium perphosphate in solid form by a very simple method whereby the salt is obtained in stable form. In accordance with my process a solution of potassium perphosphate, which may be easily prepared electrolytically, is caused to react under suitable conditions with an ammonium salt of an acid radical whose potassium salt is less soluble in water than the ammonium salt and the potassium perphosphate. In this way the potassium salt resulting from the reaction between the potassium perphosphate and ammonium salt is readily removed from the ammonium perphosphate solution remaining, either by concentrating the solution and/or by cooling, if necessary.

Among the ammonium salts of acids whose potassium salts are less soluble in water than the corresponding ammonium compound and are therefore usable in my process, I have found ammonium perchlorate, ammonium persulphate, ammonium nitrate, and ammonium sulphate particularly suitable. During the double decomposition wherein ammonium perphosphate is formed, the potassium salt of the acid radical selected, perchlorate, persulphate, nitrate, or sulphate, is precipitated, and the ammonium perphosphate remains in solution and may be readily separated from the potassium salt by filtration.

After removal of the precipitated potassium salt ammonium perphosphate in solid form may be recovered from the solution by various methods. For example, it is possible to secure the solid salt by careful evaporation of the solution, e. g., by evaporation under reduced pressure at moderately high temperatures. We have found a temperature of about 80° C. suitable when the evaporation is carried out in vacuo. In this way it is possible to obtain true solid ammonium perphosphate in yields as high as 97% based on active oxygen content of the solution.

I may also recover solid ammonium perphosphate from solutions of that salt by the addition to said solutions of an organic fluid miscible with water such as methyl alcohol. This results in the precipitation of ammonium perphosphate in the solid state. The quantity of methyl alcohol to be added corresponds approximately to the quantity of salt solution to be treated. The product crystallizes out in the form of ammonium perphosphate containing water of crystallization and may be readily dried in accordance with usual methods.

Another method for recovering solid ammonium perphosphate from its solutions involves the addition to said solutions of an excess of ammonia. This may be readily accomplished by introducing ammonia gas into the solution to be treated at a relatively low temperature such as one of 0° C. or below. When saturation of the solution with ammonia gas has occurred the ammonium perphosphate separates out in the solid state in good yields.

Under some circumstances when precipitating out the ammonium perphosphate by the addition of ammonia gas to its solution it is not necessary first to remove the potassium salt in accordance with the procedure hereinbefore described. If the potassium salt is readily soluble in an ammoniacal solution the ammonium perphosphate will be precipitated from the solution leaving the potassium salt behind in solution.

If the solution of ammonium perphosphate, which still contains the potassium salt, is carefully treated with ammonia practically the total content of ammonium perphosphate can be precipitated out without any danger of precipitation of the potassium salt.

When taking advantage of the relative insolubility of ammonium perphosphate in ammoniacal solution, as indicated in the preceding paragraph, it is possible to utilize in the double decomposition reaction between the electrolytically formed potassium perphosphate and the ammonium salt, an ammonium salt whose corresponding potassium salt is only so slightly less soluble in water than the ammonium salt and the potassium perphosphate that no precipitation takes place during the reaction. If such potassium salt is relatively soluble in an ammoniacal solution it is not necessary that it be first precipitated during the double decomposition. When recovering solid ammonium perphosphate in this way it is desirable to introduce ammonia after the double decomposition between the potassium perphosphate and ammonium salt has occurred. The ammonium perphosphate is thereby precipitated and the potassium salt remains behind in solution.

When recovering ammonium perphosphate in this way it is also desirable to have present during the double decomposition an excess of the ammonium salt. Ammonium chloride is especially suitable for this purpose. Ammonium perphosphate, formed by the addition of ammonium chloride, is readily precipitated by the addition of ammonia as neither ammonium chloride, nor potassium chloride formed as a result of the double decomposition, is precipitated from the aqueous solution except by a very high concentration of ammonia.

If desired, the separation process utilizing ammonia to precipitate out the ammonium perphosphate in solid form may also be carried out when the potassium salts formed during the double decomposition resulting in the ammonium perphosphate are either completely or partially precipitated out during that double decomposition. Before introduction of the ammonia to precipitate ammonium perphosphate the precipitated or partially precipitated potassium salt should be removed.

As examples of my novel process for preparing solid ammonium perphosphate the following may be given:

Example I

A solution of 500 grams of 95% potassium perphosphate in 900 cc. of hot water was prepared. To this solution a warm saturated solution containing 650 grams of ammonium perchlorate was added. Preferably the addition was made slowly and after the warm solution of potassium perphosphate had become cool. During the addition the resulting mixture was subjected to cooling.

The precipitated potassium perchlorate was then filtered off using a suction filter. The salt was washed in order to free it from traces of ammonium perphosphate. The filtrate was then precipitated by the addition of about 2 liters of methyl alcohol thereto. During the addition of the methyl alcohol the temperature of the ammonium perphosphate solution was maintained as low as possible.

The resulting solid salt was 82% ammonium perphosphate $(NH_4)_4P_2O_8.2H_2O$. The yield was 400 grams which corresponds to 91% of the theoretical. The product was filtered under suction and dried.

Example II

A solution of 500 grams of 95% potassium perphosphate in 700 cc. of hot water was prepared. A solution of 450 grams of ammonium nitrate in 300 cc. of warm water was also prepared. Before addition of the ammonium nitrate to the solution of potassium perphosphate, as described in the next paragraph, that solution was permitted to cool.

The ammonium nitrate solution was then added to the cold potassium perphosphate solution, the solutions being cooled during the mixing. Upon cooling to 0° C. about 400 grams of potassium nitrate was precipitated. This precipitate was removed by filtration and washed to free it of adhering ammonium perphosphate.

The filtrate, containing ammonium perphosphate in solution, was next diluted with about 2.5 liters of water. Ammonia gas was then introduced, the solution being cooled, until the greater part of the ammonium perphosphate present had been precipitated. In order to determine when filtration was complete a filtered sample was periodically titrated. The precipitated ammonium perphosphate was then removed by means of a suction filter, the temperature being maintained at about −2° C. The yield was 380 grams of 82% ammonium perphosphate and amounted to 87% of the theoretical.

Example III

A solution of 500 grams of 95% potassium perphosphate in 900 cc. of water was prepared. To this solution was added a solution of 650 grams of ammonium chloride in 1.8 liters of water. During mixing the solutions were cooled.

A 30% solution of ammonia in water was then added slowly to the resulting clear solution. The mixture was then cooled to −5° C. and the separated ammonium perphosphate removed by filtration under reduced pressure. The yield was 360 grams of 83% ammonium perphosphate corresponding to 83% of the theoretical.

It should be understood that the various details and amounts hereinbefore specified as illustrative are not to be construed as restricting the invention. The scope of my invention is to be determined in accordance with the appended claims.

I claim:

1. A process for preparing solid ammonium perphosphate which comprises the steps of reacting an aqueous solution of potassium perphosphate with an ammonium salt of an acid radical whose corresponding potassium salt is so much less soluble than said ammonium salt and potassium perphosphate that the former potassium salt precipitates in substantially quantitative amounts during the reaction, the conditions of said reaction, as to concentrations of the aqueous reagents and temperature employed during the reaction, being so selected as to insure substantially quantitative precipitation of said potassium salt, separating said precipitated potassium salt and then treating the resulting solution of ammonium perphosphate to recover said perphosphate in solid form.

2. A process for preparing solid ammonium perphosphate which comprises the steps of reacting an aqueous solution of potassium perphosphate with an ammonium salt of an acid radical whose corresponding potassium salt is so much less soluble than said ammonium salt and potassium perphosphate that the former potassium salt precipitates in substantially quantitative amounts during the reaction, the conditions of said reaction, as to concentrations of the aqueous reagents and temperature employed during the reaction, being so selected as to insure substantially quantitative precipitation of said potassium salt, separating said precipitated potassium salt and then evaporating the resulting solution to dryness under reduced pressure in order to recover said ammonium perphosphate in solid form.

3. A process for preparing solid ammonium perphosphate which comprises the steps of reacting an aqueous solution of potassium perphosphate with an ammonium salt of an acid radical whose corresponding potassium salt is so much less soluble than said ammonium salt and potassium perphosphate that the former potassium salt precipitates in substantially quantitative amounts during the reaction, the conditions of said reaction, as to concentrations of the aqueous reagents and temperature employed during the reaction, being so selected as to insure substantially quantitative precipitation of said potassium salt, separating said precipitated potassium salt and then adding methyl alcohol to the resulting solution of ammonium perphosphate in order to precipitate said salt in substantially solid form therein.

4. A process for preparing solid ammonium perphosphate which comprises the steps of reacting an aqueous solution of potassium perphosphate with an ammonium salt of an acid radical whose corresponding potassium salt is so much less soluble than said ammonium salt and potassium perphosphate that the former potassium salt precipitates in substantially quantitative amounts during the reaction, the conditions of said reaction, as to concentrations of the aqueous reagents and temperature employed during the reaction, being so selected as to insure substantially quantitative precipitation of said potassium salt, separating said precipitated potassium salt and then introducing ammonia into the resulting solution of ammonium perphosphate in order to precipitate said ammonium perphosphate in solid form.

5. A process for preparing solid ammonium perphosphate which comprises the steps of reacting an aqueous solution of potassium perphosphate with an ammonium salt selected from the group which consists of ammonium perchlorate, ammonium persulphate, ammonium nitrate and ammonium sulphate, the conditions of said reaction as to the concentrations of the aqueous reagents and the temperature of the reaction mixture being so selected as to insure substantial precipitation of a potassium salt having an anion similar to that of said ammonium salt utilized, separating the precipitated potassium salt, and then treating the resulting solution of ammonium perphosphate in order to recover said perphosphate in solid form.

6. A process for preparing solid ammonium perphosphate which comprises the steps of reacting an aqueous solution of potassium perphosphate with ammonium perchlorate, the conditions of said reaction as to the concentrations of the aqueous reagents and the temperature of the reaction mixture being so selected as to insure substantial precipitation of potassium perchlorate, separating the precipitated potassium perchlorate, and then treating said resulting solution of ammonium perphosphate in order to recover said perphosphate in solid form.

7. A process for preparing solid ammonium perphosphate which comprises the steps of reacting an aqueous solution of potassium perphosphate with ammonium sulphate, the conditions of said reaction as to the concentrations of the aqueous reagents and the temperature of the reaction mixture being so selected as to insure substantial precipitation of potassium sulphate, separating the precipitated potassium sulphate, and then treating the resulting solution of ammonium perphosphate in order to recover perphosphate in solid form.

8. A process for preparing solid ammonium perphosphate which comprises the steps of reacting an aqueous solution of potassium perphosphate with an ammonium salt of an acid radical whose corresponding potassium salt is readily soluble in aqueous ammonia solutions and but slightly less soluble in aqueous solutions than the ammonium salt and potassium salt, the conditions of said reaction as to the concentrations of the aqueous reagents and the temperature of the reaction mixture being so selected as to insure substantial precipitation of said potassium salt, removing the partially precipitated potassium salt and introducing ammonia into the resulting ammonium perphosphate solution in order to precipitate solid ammonium perphosphate therein.

9. A process for preparing ammonium perphosphate in solid form which comprises reacting an aqueous solution of potassium perphosphate with an ammonium salt of an acid radical whose corresponding potassium salt is so much less soluble than said ammonium salt and potassium perphosphate that the former potassium salt precipitates in substantially quantitative amounts during the reaction, the quantity of water present being so restricted as to insure substantially quantitative precipitation at the temperature selected for the reaction, maintaining the temperature of the reaction below about 0° C., separating said quantitatively precipitated potassium salt, and then treating the resulting solution of ammonium perphosphate to recover said perphosphate in the solid form.

10. A process for preparing ammonium perphosphate in solid form which comprises reacting an aqueous solution of potassium perphosphate with an ammonium salt of an acid radical whose corresponding potassium salt is so much less soluble than said ammonium salt and potassium perphosphate that the form potassium salt precipitates in substantially quantitative amounts during the reaction, the quantity of water present during said reaction being so restricted as to insure substantially quantitative precipitation at the temperature selected for said reaction, maintaining the temperature during said reaction below about 0° C., separating said quantitatively precipitated potassium salt, and then introducing ammonia into the resulting solution of ammonium perphosphate in order to precipitate said ammonium perphosphate therefrom in the solid form.

11. A process for preparing solid ammonium perphosphate which comprises the steps of reacting an aqueous solution of potassium perphosphate with an ammonium salt of an acid radical whose corresponding potassium salt is readily soluble in aqueous ammonia solutions and but slightly less soluble in aqueous solutions than the ammonium salt and potassium salt, the quantity of water present being restricted so that at the temperature selected for the reaction a partial precipitation of said potassium salt will occur, cooling the reaction mixture in order to maintain therein a temperature below room temperature, removing the partially precipitated potassium salt, and introducing ammonia into the resulting solution in order to precipitate solid ammonium perphosphate contained therein.

WALTER VÖLKEL.